Sept. 8, 1970  E. W. JONES, JR., ET AL  3,527,316
STEERING MECHANISM
Filed Nov. 19, 1968  2 Sheets-Sheet 1
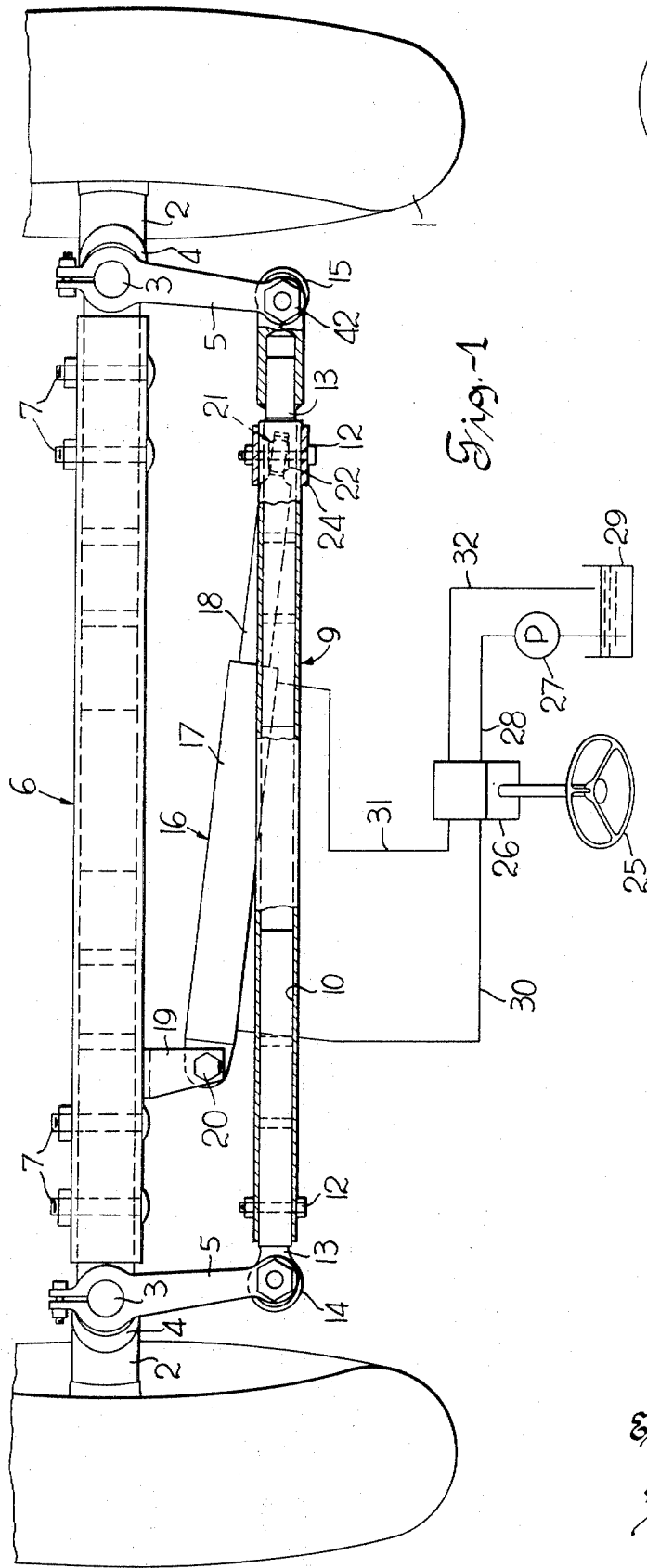
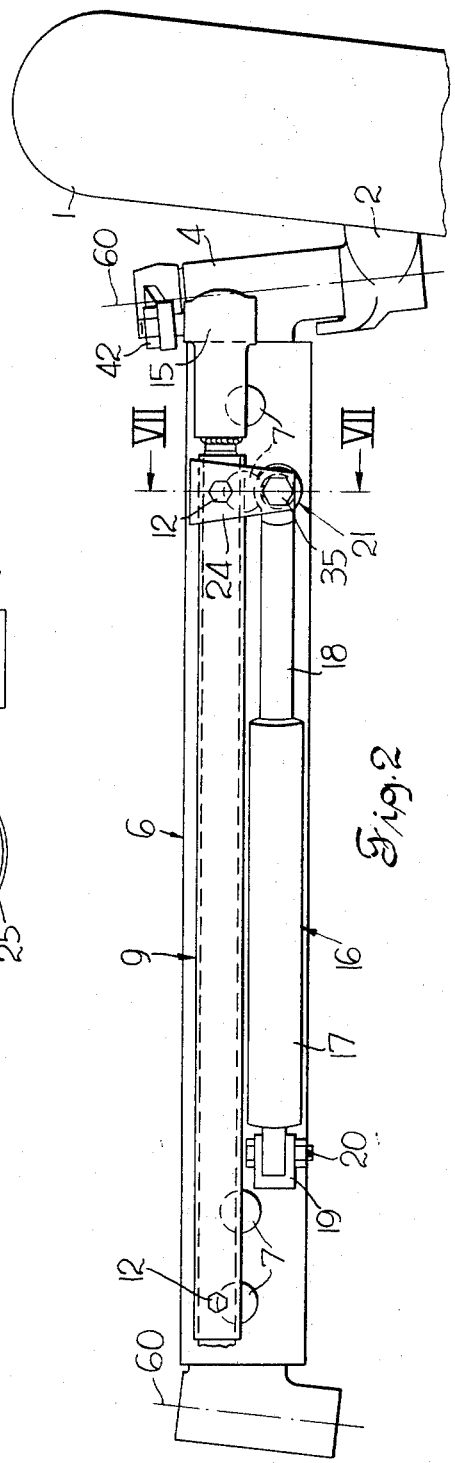

United States Patent Office 3,527,316
Patented Sept. 8, 1970

3,527,316
STEERING MECHANISM
Elborn William Jones, Jr., West Allis, and Robert E. Schott, New Berlin, Wis., assignors to Allis-Chalmers Manufacturing Company, Milwaukee, Wis.
Filed Nov. 19, 1968, Ser. No. 777,130
Int. Cl. B62d 7/16
U.S. Cl. 180—79.2
10 Claims

ABSTRACT OF THE DISCLOSURE

A steering mechanism having a modified ball joint connection on tie rod end. The ball carries a stem which rides in a slot of the socket to prevent rotational movement about the tie rod axis when operation of the actuator for the steering mechanism produces a couple tending to rotate tie rod about its own axis.

---

This invention relates to a steering mechanism and more particularly to a vehicle steering mechanism having an extendable axle and tie rod to provide variable treadwidth. The tie rod connectors produce a reaction torque to overcome a couple created by the actuator which tends to rotate the tie rod about its own axis when the vehicle wheels are steered.

A conventional vehicle employs a kingpin about which the front wheels pivot. The kingpin defines an axis which is at an angle to an intersecting vertical line. The steering arms which connect to the kingpin are generally connected to a tie rod by ball joint connectors to allow universal movement between the tie rod connecting the steering arms. The inclined positioning of the kingpin axis to the vertical line causes the end of the steering arm to rise and fall which in turn produce a see-saw movement of the tie rod as it swings from one side to the other as the vehicle is steered.

Where the hydraulic actuator used in the steering mechanism is a single rod end hydraulic cylinder and the base end is connected to the front axle, the rod is connected to the tie rod by a ball joint connection. The tie rod is moved laterally by the hydraulic cylinder. With the tie rod connection to the actuator below the axial center of the tie rod and the tie rod moving through a see-saw motion as the vehicle is steered there is a couple produced on the tie rod between the actuator connection and the steering arm connection. This couple produces a strain on the tie rod which tends to rotate the tie rod about its axis as the vehicle is steered.

Accordingly, this invention provides at least one of the ball joints connected to steering arm with a modification which will produce a reaction torque to counteract the couple produced during actuation of the fluid actuator when steering of the vehicle. The modification consists of a shank end on the ball which is connected to the steering arm and a stem which extends on the opposite side of the ball to be received in an arcuate slot of the tie rod. This construction limits the movement of the ball joint connector to rotational movement about two axes only while the third axis of rotational being the tie rod axis is nonrotatable. Any relative rotational movement between the tie rod and the actuator during the tie rod movement to and from the front axle is permitted by the ball joint connection between the tie rod and the actuator. Accordingly, it can be seen that the tie rod cannot rotate about its own axis. This eliminates any play or lost motion in the steering linkage which is undesirable in a steering mechanism of this kind.

It is an object of this invention to provide a steering linkage having connecting means on the tie rod connection to prevent any rotational movement of the tie rod about its own axis.

It is another object of this invention to provide at least a modified ball joint connector wherein the ball carries a stem for pivotal movement within a slot to prevent rotational movement on one axis of the ball joint.

It is a further object of this invention to provide a hydraulic actuator intermediate an extendable axle and a tie rod which accommodates a variable treadwidth adjustment on the vehicle with at least one of the ball joints connecting a steering arm to the tie rod having a modification to eliminate any rotational movement of the tie rod about its own axis relative to the steering arm.

The objects of this invention are accomplished by providing a front axle on a vehicle having means for extending the front axle to adjust the treadwidth of the steerable wheels. Simultaneously, with extension of the front axle the tie rod is also extended to maintain steering alignment of the steering mechanism. The front axle and the tie rod have a central portion which does not shift relative to the vehicle upon which a hydraulic actuator is connected to operate the steering linkage. The hydraulic actuator is connected by a ball joint connector to permit universal movement between the actuator and the tie rod. The tie rod ends are connected to steering arms by pivotal connections having a shank end which is rotatably mounted within the end of the steering arm.

The tie rod is connected to the steering arm by a ball joint connector wherein the ball is integral with a shank end which is received within the end of the steering arm. A stem integral with the ball is received within an arcuate slot and this limits the rotational movement of the ball joint to rotation about two axes and prevents rotation about the third axis which is the axis of the tie rod itself. This eliminates any excess steering wheel play due to movement of the tie rod about its own axis.

The preferred embodiments of this invention will be subsequently described and are illustrated in the attached drawings.

FIG. 1 is a plan view of the steering linkage and a schematic system of the hydraulic circuit.

FIG. 2 is a rear view of the steering linkage.

Figure 3:
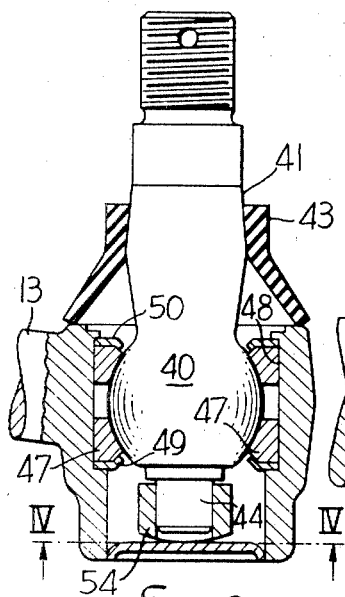
FIG. 3 is a cross section view of the ball joint connection on the end of the tie rod.

Referring to FIG. 1 and FIG. 2 steerable wheels 1 are rotatably mounted on the spindle 2 and connected to the kingpins 3. The kingpins 3 are rotatably supported in the front axle extensions 4. A steering arm 5 rotates the kingpin about their axis when the wheels 1 are steered. Suitable bearings are positioned within the front axle extensions 4 to accommodate steering of the wheels.

The front axle 6 is connected to the vehicle by a pivot pin and a suitable support bracket which permits the front axle 6 to pivot relative to the vehicle. The front axle 6 is also constructed with provisions for extending the front axle extensions 4 relative to front axle 6 by means of the bolts 7 which extend through the front axle 6 and the front axle extensions 4. A plurality of bolt holes in the front axle 6 and front axle extensions 4 are spaced for extension of the front axle 6.

Simultaneously with the extension of the front axle the tie rod 9 is also provided with the same telescoping feature to permit extension of the tie rod 9. The sleeve 10 of the tie rod 9 is provided with a plurality of bolt holes which receive bolts 12 which extend through the tie rod ends 13 and fastens the sleeve 10 to the tie rod ends 13.

The steering arms 5 are connected to the tie rod by ball joint connectors 14 and 15. It is understood that either one or both ball joint connectors may be modified to prevent axial rotation about the tie rod axis.

For the purpose of illustration only one will be shown and this ball joint connector will be ball joint connector 15 as shown on the right hand end of FIGS. 1 and 2. The modified ball joint connector 15 is the ball joint connector most closely affected by the action of the actuator 16.

The actuator 16 consists of a cylinder 17 and a rod 18. The base end of the cylinder 17 is connected by a pivoting connection consisting of a bracket 19 and a bolt 20 in which the bracket 19 is fastened to the front axle 6. The rod end of the actuator 16 is connected by a ball joint connector 21 consisting of a ball 22 received within a socket of bushing 23 in the rod 18.

The brackets 24 are attached to the sleeve 10 of the tie rod 9 by means of the bolt 12. The brackets 24 are also connected to the rod 18 by the ball 22 and bolt 35 which is fastened to the brackets 24. The bushing 23 receives the ball 22 and is seated within the rod 18. Spacers 37 and 38 maintain a central position of the ball 22 in the bushing 23.

It is noted that the connection of the hydraulic actuator 16 is below center of the tie rod 9. It is also understood that during the steering operation of the vehicle that the tie rod 9 will swing in a see-saw motion as the wheels are steered due to the rotational movement of the kingpins 3 about their axes causing the steering arms 5 to raise and lower their connectors 14 and 15 producing this motion. Consequently, a reaction torque is necessary in the ball joint 15 to counteract the torque produced by the actuator 16 in its connection to the tie rod 9.

The vehicle is steered by the steering wheel 25 which is connected to the control valve 26. A pump 27 is connected by conduit 28 to reservoir 29 and to the valve 26. Conduits 30 and 31 supply fluid to the hydraulic actuator 16 and the return conduit 32 returns the fluid to the reservoir 29.

Figure 5:
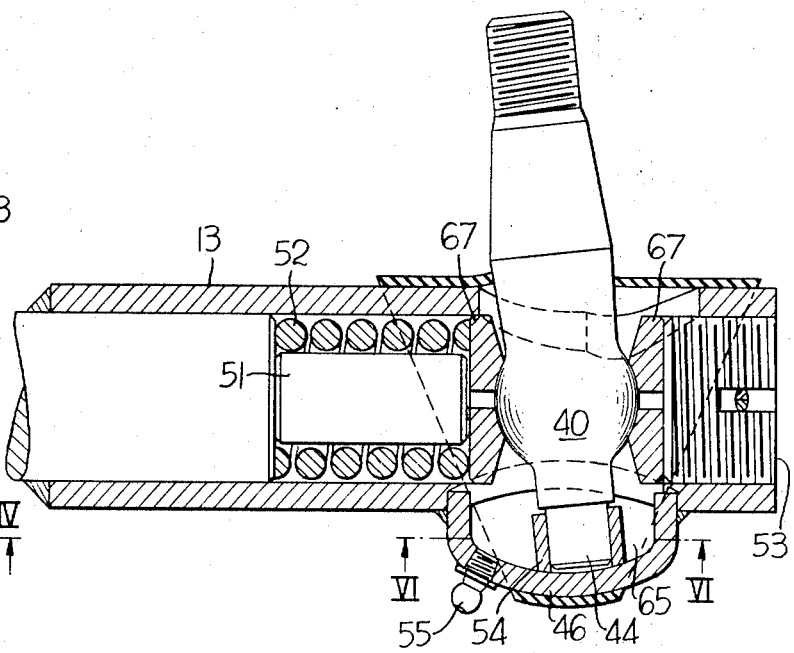
FIG. 5 is a cross section view of a modification of the ball joint connector.
Figure 4:
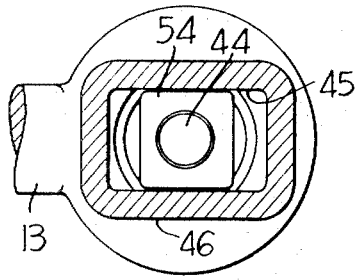
FIG. 4 is a cross section view taken on line IV—IV of FIG. 3.
Figure 6:
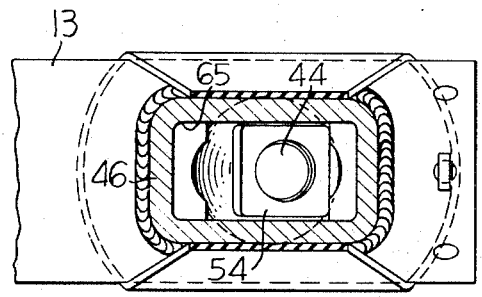
FIG. 6 is a cross sectional view taken on line VI—VI of FIG. 5.
Figure 7:
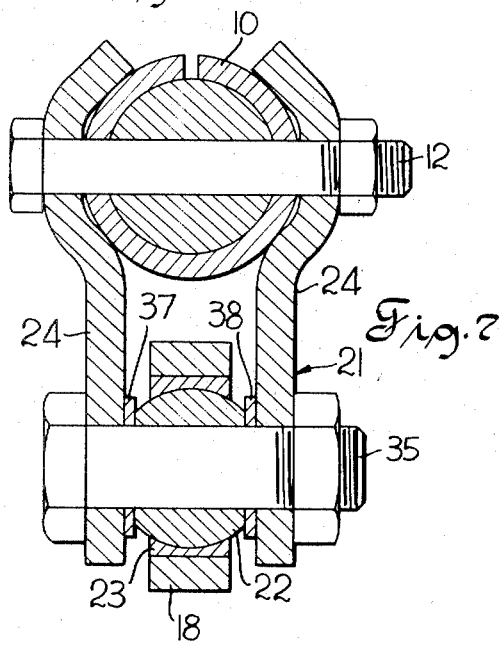
FIG. 7 is a cross section view taken on line VII—VII of FIG. 2.

The modified ball joint 15 is shown in FIGS. 3 and 4, and another version is shown in FIGS. 5 and 6. Referring to FIGS. 3 and 4 the ball joint consists of the ball 40 integral with a shank end 41. The shank end 41 is received within the end of the steering arm 5 and is fastened by means of a nut 42. The seal 43 is positioned below the arm 5. The ball 40 is also integral with the stem 44 which extends into square bushing 54 received in the slot 45 in the casing 46. The ball 40 is seated within the segmented bushing 47 which is embraced within the annular opening 48 of the end of the tie rod end 13. The bushing 47 is mounted on a seat 49 and fastened in this position by a snap ring 50.

The ball 40 is shown in FIGS. 5 and 6 received within the tie rod end 13 which also receives a cylindrical stud 51 upon which the end of the segmented bushing 67 is seated. The spring 52 biases the busing 67 to a firm engagement with the ball 40 on the left-hand side while the right-hand side engages a plug 53 which is screwed into the end of the tie rod end 13 to maintain a firm engagement between the socket of the bushing with the ball 40. The stem 44 extends into the arcuate slot 65 and is embraced by a bushing 54. The casing 46 is provided with a grease fitting 55 to receive grease within the arcuate slot 65.

FIG. 6 shows the cross section view of the ball joint connector from the end of the stem. The arcuate slot 65 receives the bushing 54 carried on the stem 44 to permit arcuate pivotal movement within the slot 65 as the ball 40 moves within the tie rod end 13.

The ball segment 44 can rotate about at least two axes of rotation and is restrained from rotating in the axis which is the axis of a tie.

Figure 8:
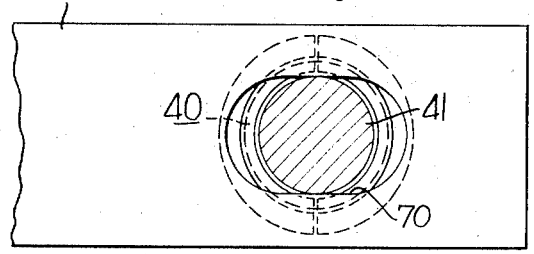
FIG. 8 is a fragmentary view showing a modification wherein the shank and ball are used to limit rotation.

FIG. 8 illustrates a modified version where the slot 70 receiving the shank 41 to prevent rotation of the tie rod about its own axis. The stem is eliminated in this version although the ball is received in a socket as previously described.

The steering device will be described in the following paragraphs.

The tie rod 9 consisting of the sleeve 10 and the tie rod ends 13 moves transversely in the view as shown in FIG. 2. The axis 60 of the kingpin 3 is inclined to an intersecting vertical line. Consequently the radially outer end of the steering arm 5 rotates in a plane inclined to a horizonta plane. When the steering wheel 25 is steered, the steering arm ends will move in a manner whereby one end will move upwardly while the end of the opposite steering arm will move downwardly. The tie rod will similarly rise on one end and fall on the other end as the vehicle is steered in one direction.

When the steering wheel is rotated in the opposite direction the steerable wheels 1 will steer in the opposite direction. The tie rod will accordingly swing to the opposite side of the vehicle and rise on the opposite end and fall on the other end. The see-saw action causes a varying magnitude of the couple on the tie rod. This couple is produced by the ball joint 21 which connects the tie rod to the rod end of the actuator 16 which is positioned below the axial center of the tie rod and the connection of the joints 14 and 15 which tends to rotate the tie rod about its own axis. The magnitude of the couple is varied by the actuation force of the actuator 16 and the position of the steering arms 5.

The tie rod 9 moves within a range which is of a varying distance from the front axle 6. This is caused by steering arms 5 rotating about their axial centers of the kingpin axis 60. This movement must be accommodated and accordingly the ball joint connector 21 will permit this movement to and from the proximity of the front axle 6 as the actuator 16 is actuated. The off-center connection of the rod 18 causing a couple on the tie rod will be overcome by a reaction torque produced by the modified ball joint connector 15.

The ball 40 may rotate on two axes which are normal to the axis of the tie rod and normal to each other. This will accommodate the see-saw movement of the tie rod 9 and the movement of the tie rod to and from a front axle. Any rotational tendency of the tie rod about its own axis is to overcome by the stem 44 on the ball 40. The stem end rides in a slot 45 and the pivotal movement about an axis normal to the plane of the slot in the tie rod and is not restrained. Movement about the axis of the shank and stem is also permitted since the ball can rotate within the bushing 47. A couple producing a tendency to rotate on the axis of the tie rod is overcome by the reaction torque of the stem 44 in the slot 45. This produces a tight steering linkage and prevents any rotation on this axis. The shank end 41 of the ball 40 is also received in a cone shaped sleeve which prevents rotation in the axis normal to the axis of the shank end.

The steering mechanism is provided with freedom of movement to accommodate the movement of the tie rod as the steering mechanisms swing from one side to the other. The movement of the tie rod to and from the front axle is also permitted due to the ball joint connector 21 and connectors 14 and 15. The front axle 6 which connects to the base end of the actuator 16 and the sleeve 10 of the tie rod 9 which is connected to the rod end 18 of the actuator 16 remain aligned for proper steering. Extension of the front axle 6 and the tie rod 9 can be accomplished without changing the steering alignment. Accordingly, the steering linkage has eliminated any play or lost motion which would tend to cause excessive rotation of the steering wheel 5 when the vehicle is steered. The ball joint connectors provide freedom of movement and yet retain good response to any steering movement.

The embodiments of the invention in which an exclusive property or privilege is claimed are defined as follows:

1. A steering linkage for a vehicle comprising an axle, a tie rod, an actuator connected between the axle and the tie rod, at least one kingpin defining an axis of rotation, a steering arm connected to the kingpin, a modified ball joint connector movably connecting said tie rod to said steering arm including, a ball having a radially extending element extending therefrom, said tie rod defining a socket and a slot receiving said ball and said element respectively to limit the element to movement permitted by said slot and prevent rotational movement of the ball about the axis of the tie rod, said hydraulic actuator thereby moving said ball about axes other than the axis of the tie rod when the vehicle is steered.

2. A steering linkage for a vehicle comprising an axle, a pair of steerable wheels, a kingpin connected to a spindle for rotatably supporting each of said wheels and a steering arm to provide steering of each of said wheels, a tie rod movably connected to each of said steering arms, a hydraulic actuator movably connected between said axle and said tie rod, at least one modified ball joint connector connecting one of said steering arms to said tie rod including, a ball having a stem and a shank, means connecting the shank of said ball to said steering arm, a socket defined by said tie rod receiving said ball, a slot defined by said tie rod receiving said stem confining the movement of the said ball to rotational movement about axes other than the axis of said tie rod, said modified ball joint thereby preventing steering linkage lost motion due to rotational movement about the axis of said tie rod when the vehicle is steered.

3. A steering linkage as set forth in claim 1 wherein a single rod end hydraulic actuator is used to actuate the steering linkage.

4. A steering linkage as set forth in claim 1, wherein said radially extending element is a shank received in said slot.

5. A steering linkage as set forth in claim 1, wherein said modified ball joint connector connecting the steering arm to the tie rod includes a shank on the ball connected to the steering arm and a diametrically opposite stem received in a slot.

6. A steering linkage as set forth in claim 2, wherein the tie rod and the axle are extendable to permit adjustment of treadwidth of the vehicle wheels.

7. A steering linkage set forth in claim 2, wherein the rotational movement of the modified ball joint connector is limited to the movement of the stem in a slot and the rotational movement of the ball on the stem axis.

8. A steering linkage as set forth in claim 1, wherein the modified ball joint connector includes a square bushing on a stem of said ball which is received within a slot to control the movement of the ball.

9. A steering linkage as set forth in claim 2 wherein the axle and the tie rod have telescoping mechanisms to permit tread adjustment and maintain steering alignment of the steerable wheels and the hydraulic actuator is connected to the nonmovable parts on said tie rod of said axle.

10. A steering linkage as set forth in claim 1 wherein said ball of said modified ball joint is received within a segmented bushing permitting adjustment of pressure on the ball by the socket on the end of the tie rod and a shank extends from said ball to be received in the end of the steering arm.

References Cited
UNITED STATES PATENTS

| 2,911,229 | 11/1959 | Strehlow | 280—34 X |
| 3,411,804 | 11/1968 | Hill et al. | 280—34 X |
| 3,384,396 | 5/1968 | Hamilton | 287—87 |

KENNETH H. BETTS, Primary Examiner

U.S. Cl. X.R.
280—95; 287—90

Disclaimer 3,527,316.—*Elborn William Jones, Jr.,* West Allis and *Robert E. Schott,* New Berlin, Wis. STEERING MECHANISM. Patent dated Sept. 8, 1970. Disclaimer filed Mar. 26, 1981, by the assignee, *Allis-Chalmers Corp.*

Hereby enters this disclaimer to claims 1 through 7 of said patent.

[*Official Gazette June 23, 1981.*]